Patented Feb. 20, 1945

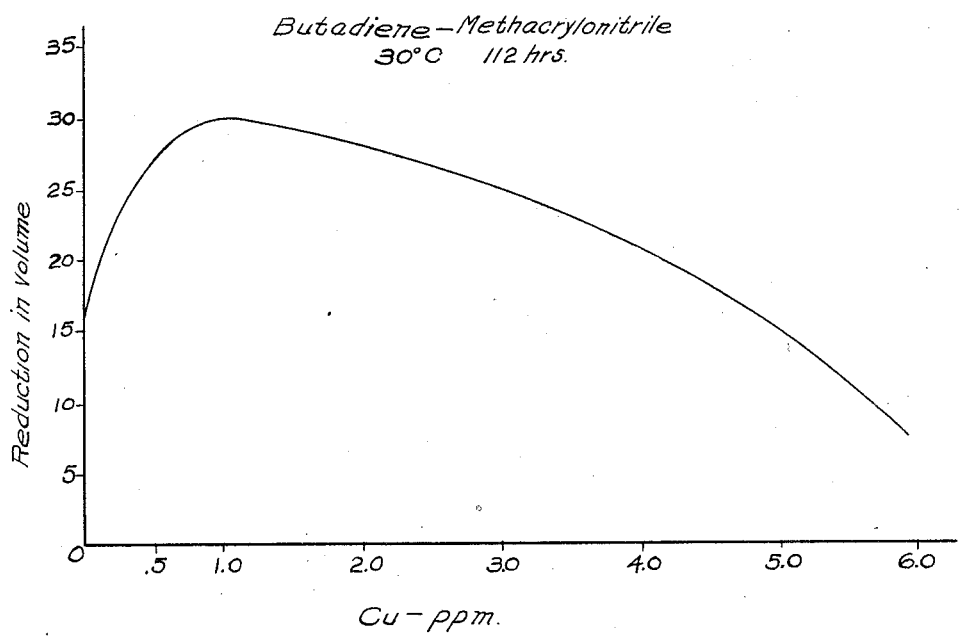

2,370,010

UNITED STATES PATENT OFFICE 2,370,010

METHOD OF POLYMERIZATION

Albert M. Clifford, Stow, and William D. Wolfe, Cuyahoga Falls, Ohio, assignors to Wingfoot Corporation, Akron, Ohio, a corporation of Delaware Application February 25, 1939, Serial No. 258,508

4 Claims. (Cl. 260—84.5)

This invention relates to an improved method of effecting polymerization of unsaturated monomeric materials and, more particularly, to the effect of metals on the rate of polymerization.

In the preparation of copolymers by the polymerization of two or more monomeric materials to constitute plastic masses, it is usually necessary to continue the treatment for several days since the temperature cannot be increased without undesirably affecting the nature of the polymerized mass. The long period required to carry the copolymerization to completion renders the methods of preparation now in use uneconomical and makes the cost of the copolymers unduly high. Consequently, it has been sought to reduce the reaction time and thus make it possible to increase the yield of product from a given equipment capacity and, in addition, to provide means of obtaining products of desirable physical characteristics.

One characteristic of the copolymerization of monomeric mixtures which increases the elapsed time to completion of the reaction is the so-called induction period, in some cases a matter of many hours, during which no appreciable polymerization can be noted. Once polymerization sets in, the mixture completely polymerizes fairly readily. Investigations have been undertaken to determine if this induction period could be shortened. It has been found that the presence of certain metals in very small amounts has a decided effect on the time required for polymerization. Thus, copper is found to exert a profound effect on the time required for the polymerization of a monomeric mixture containing a butadiene and an ester or a nitrile of an acrylic acid. These substances are preferably copolymerized in an aqueous emulsion containing an emulsifying agent, such as sodium oleate, an oxidant, such as sodium perborate, and a catalyst, such as carbon tetra chloride. When such an emulsion is prepared and the polymerizable monomers are added thereto, the emulsion may or may not contain copper measures in parts per million and derived usually from the water used. Investigation has shown that the amount of copper thus present is very important as respects the course of the polymerization reaction and, furthermore, the effect varies with the amount of copper present, even though this amount must be expressed as a few parts per million on the total mass of the emulsion and its contents.

As mentioned, copper may appear in the emulsion from the water used and it was discovered that the amount of copper thus adventitiously added promoted the polymerization in some cases and retarded or entirely prevented it in others. Further investigation was made with carefully purified materials so that the amount of copper present was known. Runs made with proportions of copper ranging from 0 to 5, 10 or 15 P. P. M. established the remarkable fact that increases in the amount from 0 to 5 P. P. M. caused a definite shortening in the reaction period, to a minimum, while further increase in the copper lengthened the reaction period and diminished the yield until the copper appeared to act as a polymerization inhibitor.

The effect can be seen in the accompanying drawing where the reduction in volume of a mixture of butadiene and methacrylo nitrile has been plotted against the amount of copper in P. P. M. present in the reaction medium. The reduction in volume refers to the shrinkage in bulk of the emulsion containing the mixture of monomers while being heated at 30° C. and this shrinkage indicates fairly accurately the extent to which polymerization has proceeded. It will be noted that the minimum time for polymerization, as shown by the total shrinkage in the elapsed time of 112 hours, was attained when the copper content was between one and two P. P. M. and that considerable improvement in the rate of reaction was apparent when the copper content was between 0.5 part and 5 P. P. M. The difference is even more marked if observations be made after a shorter elapsed interval from the commencement of the treatment since the induction period will not then have been spanned and the reduction in volume at low copper concentrations will be negligible.

The concentration of copper may be measured colorimetrically by means of sodium diethyl dithiocarbamate which produces a decided yellow coloration in concentrations of copper as dilute as 1 part of Cu per million and may be used to indicate the presence of the metal in concentrations as low as 1 part in 5 million parts of water, provided other metals be not present in appreciable amounts. The copper content was determined by comparison with freshly prepared standard solutions having established copper contents, 1 cc. of approximately 1% sodium diethyl dithiocarbamate solution in water freshly distilled through all glass apparatus being added to the standards and to the water being analyzed.

Emulsions were prepared containing known amounts of copper by comparison with the standards. The copper was added to water in the form of N/100 copper sulfate solution and a standard batch made up of the following composition:

|  | Grams |
|---|---|
| 3% sodium oleate solution | 20 |
| NaBO₃.4H₂O | 0.133 |
| CCl₄ | 0.48 |
| Butadiene (freshly distilled into bomb) | 12.0 |
| Methacrylic nitrile | 4.0 |

The copper-charged water was used in making up the sodium oleate solution and all other ingredients of the batch were tested copper-free.

The polymerization was conducted at a temperature of 30° C. and different amounts of copper gave varying results as follows:

| P. P. M. Cu | Rate | | Yield |
|---|---|---|---|
| | M. M. | Hours | |
| 0 | 17 | 112 | 55.5 |
| 0.5 | 27 | 112 | 92.2 |
| 1.0 | 30 | 112 | 93.1 |
| 2.0 | 28 | 112 | 85.6 |
| 5.0 | 15 | 112 | 47.2 |

It will be observed that there was an improvement in the rate of polymerization, expressed in M. M. shrinkage of the charge, at 112 hours reaction time, as the copper content was increased to 1 P. P. M. and that the effect then fell off, although still substantial at 3 P. P. M. until, at 5 P. P. M. of copper, the shrinkage was approximately the same as that when no copper was present. The yields obtained represent results after completion of the polymerization at 160 hours.

Similar results are obtained when butadiene and acrylic nitrile are copolymerized and the new method is applicable to various copolymers of the same type, among these being copolymers of butadiene or a homologue of butadiene, such as methyl butadiene or isoprene, dimethyl butadiene, etc., with a monomer from the group consisting of esters and nitriles of acrylic acids, such as acrylo nitrile, methacrylonitrile, ethacrylonitrile, methyl acrylate, methyl methacrylate, ethyl acrylate, ethyl methacrylate, 2-ethyl hexyl methacrylate, isobutyl acrylate, isoamyl acrylate, and isoamyl ethacrylate.

The conditions under which the polymerization is conducted are similar to those customarily employed except for the control of the copper concentration, the copper being present, of course, in dissolved form, as in a solution of a copper salt. Polymerization ensues in an emulsion which may contain sodium oleate as the emulsifying agent, Aquarex D (a sodium sulphate ester of higher alcohols), or other emulsifying agents which are customarily used in copolymerization. Sodium perborate, H₂O₂, benzoyl peroxide or other oxidant is also present and, likewise, the presence of carbon tetrachloride, trichloropropionitrile, or other halogen compound is found to be helpful. The temperature prevailing during reaction ranges preferably from about 30°-50° C. but may be either higher or lower, polymerization sometimes being conducted at room temperature or at a temperature as high as 80° C. In general, the conditions of the polymerization are those known in the art and the improved method, characterized by control of the copper content, may be used in connection with any of the various emulsions heretofore found to be effective in the preparation of copolymers of the type described.

Accordingly, while there has been described above a preferred embodiment of the invention, the same is not limited thereto but only by the appended claims wherein it is intended to set forth all features of patentable novelty residing in such invention.

What we claim is:

1. A method of polymerization which comprises treating a mixture of butadiene and a monomer from the group consisting of esters and nitriles of acrylic acids in an aqueous medium containing an emulsifying agent, an oxidant, and from about 0.5 to 3.0 parts per million of copper in solution.

2. A method of polymerization which comprises treating a mixture of a butadiene and a monomer from the group consisting of esters and nitriles of acrylic acids in an aqueous medium containing an emulsifying agent, an oxidant and about 0.5 to 3.0 P. P. M. of copper in solution.

3. A method of polymerization which comprises treating a mixture of a butadiene and a monomer from the group consisting of esters and nitriles of acrylic acids in an aqueous medium containing an emulsifying agent, an oxidant and about 1.0 P. P. M. of copper in solution.

4. A method of polymerization which comprises treating a mixture of butadiene and a monomer from the group consisting of esters and nitriles of acrylic acids in an aqueous medium containing an emulsifying agent, an oxidant and about 1.0 P. P. M. of copper in solution.

ALBERT M. CLIFFORD.
WILLIAM D. WOLFE.